US008229816B1

(12) United States Patent
Mattison et al.

(10) Patent No.: US 8,229,816 B1
(45) Date of Patent: Jul. 24, 2012

(54) INTELLIGENT CASH RECYCLER REMOTE CAPABILITIES

(75) Inventors: Paul Martin Mattison, Sherrills Ford, NC (US); Timothy Bryan Vannatter, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 117 days.

(21) Appl. No.: 12/238,134

(22) Filed: Sep. 25, 2008

(51) Int. Cl.
*G06Q 40/00* (2012.01)
(52) U.S. Cl. .................. 705/35; 705/7; 705/39; 705/42; 705/43; 235/379; 235/381; 194/200; 194/206; 340/5.28; 340/679; 370/254
(58) Field of Classification Search .................. 705/7, 35, 705/39, 42, 43; 235/379, 381; 194/200, 194/206; 340/5.28, 679; 370/254
See application file for complete search history.

(56) References Cited

U.S. PATENT DOCUMENTS

| 6,230,928 | B1 | 5/2001 | Hanna et al. | |
|---|---|---|---|---|
| 6,848,612 | B2 | 2/2005 | Uematsu et al. | |
| 6,983,836 | B2 | 1/2006 | Adams et al. | |
| 7,025,255 | B1 | 4/2006 | Drummond et al. | |
| 7,269,279 | B2 | 9/2007 | Chiles | |
| 7,340,451 | B2 | 3/2008 | Sacco | |
| 7,347,358 | B2 | 3/2008 | Ireland et al. | |
| 7,635,085 | B2 | 12/2009 | Brown et al. | |
| 2001/0014881 | A1* | 8/2001 | Drummond et al. | 705/43 |
| 2001/0020638 | A1 | 9/2001 | Uematsu et al. | |
| 2001/0054643 | A1 | 12/2001 | Siemens | |
| 2002/0120572 | A1 | 8/2002 | Bellucci et al. | |
| 2003/0033251 | A1 | 2/2003 | Sherlock | |
| 2003/0083969 | A1 | 5/2003 | Uchiyama et al. | |
| 2003/0145205 | A1 | 7/2003 | Sarcanin | |
| 2004/0034594 | A1* | 2/2004 | Thomas et al. | 705/39 |
| 2004/0111346 | A1* | 6/2004 | Macbeath et al. | 705/35 |

(Continued)

FOREIGN PATENT DOCUMENTS

DE 10 2006 040 780 A1 3/2008

(Continued)

OTHER PUBLICATIONS

International Search Report and the Written Opinion of the International Searching Authority mailed Jan. 8, 2010 for International Application No. PCT/US2009/058601.

(Continued)

*Primary Examiner* — James Trammell
*Assistant Examiner* — Sanjeev Malhotra
(74) *Attorney, Agent, or Firm* — Michael A. Springs; Moore and Van Allen, PLLC; Jeffrey R. Gray

(57) ABSTRACT

A method, system, computer program product, and apparatus, or a combination of the foregoing for remotely connecting to an Intelligent Cash Recycler. A user connects to any Intelligent Cash Recycler tied into the system in order to remotely access, monitor, communicate, update, troubleshoot, perform maintenance on, and settle accounts of the remotely located Intelligent Cash Recyclers. Incident reports are created in real-time to indicate when there is an issue with a particular Intelligent Cash Recycler. The system routes the incident reports to the appropriate groups, so that the groups may address the incident reports and resolve the problem. Specifically, a group may, for example, resolve some incidents by making changes to the remotely located cash recycler configuration settings, pushing new files to the recycler, or updating the software or firmware associated with the remotely located cash recycler.

11 Claims, 3 Drawing Sheets

U.S. PATENT DOCUMENTS

| | | | |
|---|---|---|---|
| 2004/0222286 A1* | 11/2004 | Douglass et al. | 235/381 |
| 2004/0231956 A1 | 11/2004 | Adams et al. | |
| 2004/0249718 A1 | 12/2004 | Kuroda et al. | |
| 2005/0080731 A1 | 4/2005 | Dnyaneshwar | |
| 2005/0096986 A1 | 5/2005 | Taylor et al. | |
| 2005/0108164 A1* | 5/2005 | Salafia et al. | 705/42 |
| 2005/0173515 A1 | 8/2005 | Sawa | |
| 2005/0289051 A1 | 12/2005 | Allin et al. | |
| 2006/0022032 A1 | 2/2006 | Fillinger et al. | |
| 2006/0208852 A1* | 9/2006 | Wenzlik et al. | 340/5.28 |
| 2007/0050291 A1 | 3/2007 | Avazian et al. | |
| 2007/0063016 A1 | 3/2007 | Myatt et al. | |
| 2007/0235523 A1* | 10/2007 | Clements | 235/379 |
| 2008/0047801 A1* | 2/2008 | Nakatsuka et al. | 194/206 |
| 2008/0149706 A1* | 6/2008 | Brown et al. | 235/379 |
| 2009/0160668 A1* | 6/2009 | Crowley et al. | 340/679 |
| 2009/0161580 A1* | 6/2009 | Forsyth | 370/254 |
| 2009/0313057 A1* | 12/2009 | Slayton et al. | 705/7 |
| 2010/0010904 A1 | 1/2010 | Sanders et al. | |
| 2010/0025183 A1* | 2/2010 | Folk et al. | 194/200 |

FOREIGN PATENT DOCUMENTS

| | | |
|---|---|---|
| EP | 1 486 923 A2 | 12/2004 |
| WO | WO 2004/081779 A1 | 9/2004 |
| WO | WO 2005/038623 A2 | 4/2005 |
| WO | WO 2008/080101 A2 | 7/2008 |

OTHER PUBLICATIONS

International Search Report and the Written Opinion of the International Searching Authority mailed Jan. 26, 2010 for International Application No. PCT/US2009/065720.

International Search Report and the Written Opinion of the International Searching Authority mailed Mar. 31, 2010 for International Application No. PCT/US 09/58743.

\* cited by examiner

INTELLIGENT CASH RECYCLER REMOTE CAPABILITIES

FIELD

This invention relates generally to the field of cash recyclers, and more particularly embodiments of the invention relate to systems, methods, and computer program products for remotely accessing, communicating, updating, troubleshooting, performing maintenance on, and settling accounts of remotely located intelligent cash recyclers.

BACKGROUND

As known, cash recyclers are used for depositing, withdrawing, counting, and tracking cash in a multitude of locations. These locations include banks, retail establishments, check cashing facilities, loan advance locations, casinos, or in other businesses where cash recyclers aid in the process of automated cash handling. Automated cash handling is a process that typically includes a teller opening a cash drawer at the beginning of the day. The teller does this by removing a specified amount of money from the cash recycler. Then at the end of the day, the teller will deposit cash back into the cash recycler. The cash recycler will count the cash and it will be held in the safe inside the cash recycler for safe keeping. A manager has the ability to set the permissions on the cash recycler, in order to limit the options a teller may have, or even prevent access altogether. Cash recyclers may also be used by the business throughout the day for depositing, withdrawing, and exchanging bank notes into different denominations. Typically, in the past, cash recyclers have been located at banks and not in customer facing fashions at remote locations. Therefore, when problems occurred or recycler balances needed to be checked, fixes or balance inquiries were completed quickly, since recyclers were on-site at the bank. More recently, banks began deploying the machines in the back offices of businesses, in order to provide improved cash handling for the businesses and more security for the businesses' money from misappropriation. Furthermore, cash recyclers reduce business costs associated with accounting, handling, and counting the business's cash at the beginning and end of the day.

Currently, if a customer has a remote cash recycler and problems arise with it, the customer must call a technician to come fix the problem. A technician travels to the remote location to troubleshoot the cash recycler and then tries to fix the problem without having any idea about what the problem is before arriving. Furthermore, recycler suppliers have no ability to remotely update the recycler's software or change the recycler's configurable settings when they are located offsite. Instead, a technician is dispatched to the recycler location and performs the necessary updates one recycler at a time. Any recycler updates, particularly mass updates, will not be made in a timely fashion, and thus will be made at great costs. Furthermore, since the recyclers are located off-site, the recycler suppliers, which are usually financial institutions, have no way of tracking the deposits and withdrawals of a recycler on a daily basis. A bank employee must be sent to the site periodically to withdraw or deposit cash regardless of the actual cash recycler balances. As the number of recyclers located remotely increases, the practice of dispatching a technician or bank employee periodically to the remote location will no longer be economically or logistically feasible.

It is necessary to develop a system and associated method for implementing a system that communicates with remotely located cash recyclers in an easy, intuitive, and cost-effective way for system administrators or other users. Remote capabilities would allow the bank to remotely access a cash recycler and perform a multitude of functions without ever having to send a technician to the off-site location.

BRIEF SUMMARY

Embodiments of the present invention address the above needs and/or achieve other advantages by providing a method, system, computer program product, and apparatus, or combination of the foregoing for remotely connecting to an Intelligent Cash Recycler.

One embodiment of the invention is an intelligent cash management system that allows a user to remotely access a cash recycler. The system comprises a computer-readable medium providing computer-readable instructions, a monitoring system, and a processor operatively coupled to the monitoring system and the computer-readable medium. The processor is configured to execute the computer-readable instructions to use the monitoring system to identify recycler incidents, assign the recycler incidents to a group so the group can determine an associated issue, and close out the recycler incidents after the group has resolved the issue.

In further accord with one embodiment of the invention, the recycler incidents comprise at least one recycler metric that is outside of defined threshold limits.

In another embodiment of the invention, the system comprises a software distribution system. The processor is operatively coupled to the software distribution system. The processor is configured to execute the computer-readable instructions to use the software distribution system to update the operating system, firmware, software applications, or settings on a remotely located cash recycler.

In another embodiment of the invention, the system comprises an operations interface system. The processor is operatively coupled to the operations interface system. The processor is configured to execute the computer-readable instructions to use the operations interface system to change a configuration setting, an access entitlement, or a password on a remotely located cash recycler.

In one embodiment of the invention, the system comprises an intelligent cash manager database. The processor is operatively coupled to the intelligent cash manager database. The processor is configured to execute the computer-readable instructions to use the intelligent cash manager database to store for retrieval a file or back-up file comprising the cash usage, the transaction history, the profile data of a user, the software maintenance history, the configuration settings, or the transportation schedule file associated with a remotely located cash recycler.

In further accord with an embodiment of the invention, the system comprises a display device. The processor is operatively coupled to the display device. The processor is configured to execute the computer-readable instructions to use the display device to display in dashboard information about the recycler incidents tracked in the monitoring system.

Another embodiment of the invention is a method for remotely accessing, monitoring, and servicing intelligent cash recyclers. The intelligent cash management system allows a user to access at least one remotely located cash recycler. The method comprises using a computer system for accessing a remotely located recycler. Then monitoring a metric for the remotely located cash recycler. Next, receiving an incident when the metric is outside of a determined threshold limit. Then resolving the incident.

In one embodiment of the invention, the method comprises logging onto the remotely located recycler and temporarily taking over control of the recycler.

In another embodiment of the invention, the method comprises using a display device to monitor the metric related to the recycler on a dashboard.

In further accord with one embodiment of the invention, the method comprises performing diagnostic checks of the at least one remotely located recycler.

In another embodiment of the invention, the method comprises sending the incident electronically to a group responsible for resolving the incident.

In yet another embodiment of the invention, the method comprises monitoring the status of the incident until the incident is resolved.

In one embodiment of the invention, the method comprises updating the recycler by making changes to a recycler configuration setting, pushing a new file to a recycler, or updating software or firmware associated with a recycler.

One embodiment of the invention is a computer program product for remotely accessing and monitoring a remotely located cash recycler. A user can access the remotely located cash recycler through an intelligent cash management system. The computer program product comprises a computer-readable medium having computer-readable program code portions embodied therein. The computer-readable program code portions comprise a first executable portion and a second executable portion. The first executable portion is configured for logging onto the remotely located cash recycler. The second executable portion is configured for remotely monitoring a metric associated with the remotely located recycler.

In one embodiment of the invention, logging onto the remotely located cash recycler comprises being able to access configuration settings, software, firmware, access entitlements, user passwords, or transaction histories of the remotely located cash recycler.

In further accord with one embodiment of the invention, the computer program product comprises an executable portion configured for updating the remotely located recycler by making changes to the recycler configuration settings, pushing a new file to the recycler, or updating the software or firmware associated with the recycler.

In another embodiment of the invention, the computer program product comprises an executable portion configured for using a display device to take the metric associated with the remotely located recycler and display the metric on a dashboard.

In yet another embodiment of the invention, the computer program product comprises an executable portion configured for receiving an incident report for the metric if it is outside of determined threshold limits.

In one embodiment of the invention, the computer program product comprises an executable portion for assigning the incident report to a group responsible for resolving the incident report.

In another embodiment of the invention, the computer program product comprises an executable portion configured for resolving the incident report by making changes to the recycler configuration settings, pushing a new file to the recycler, or updating the software or firmware associated with the recycler.

In further accord with one embodiment of the present invention, the computer program product comprises an executable portion for performing diagnostic checks of the remotely located recycler.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
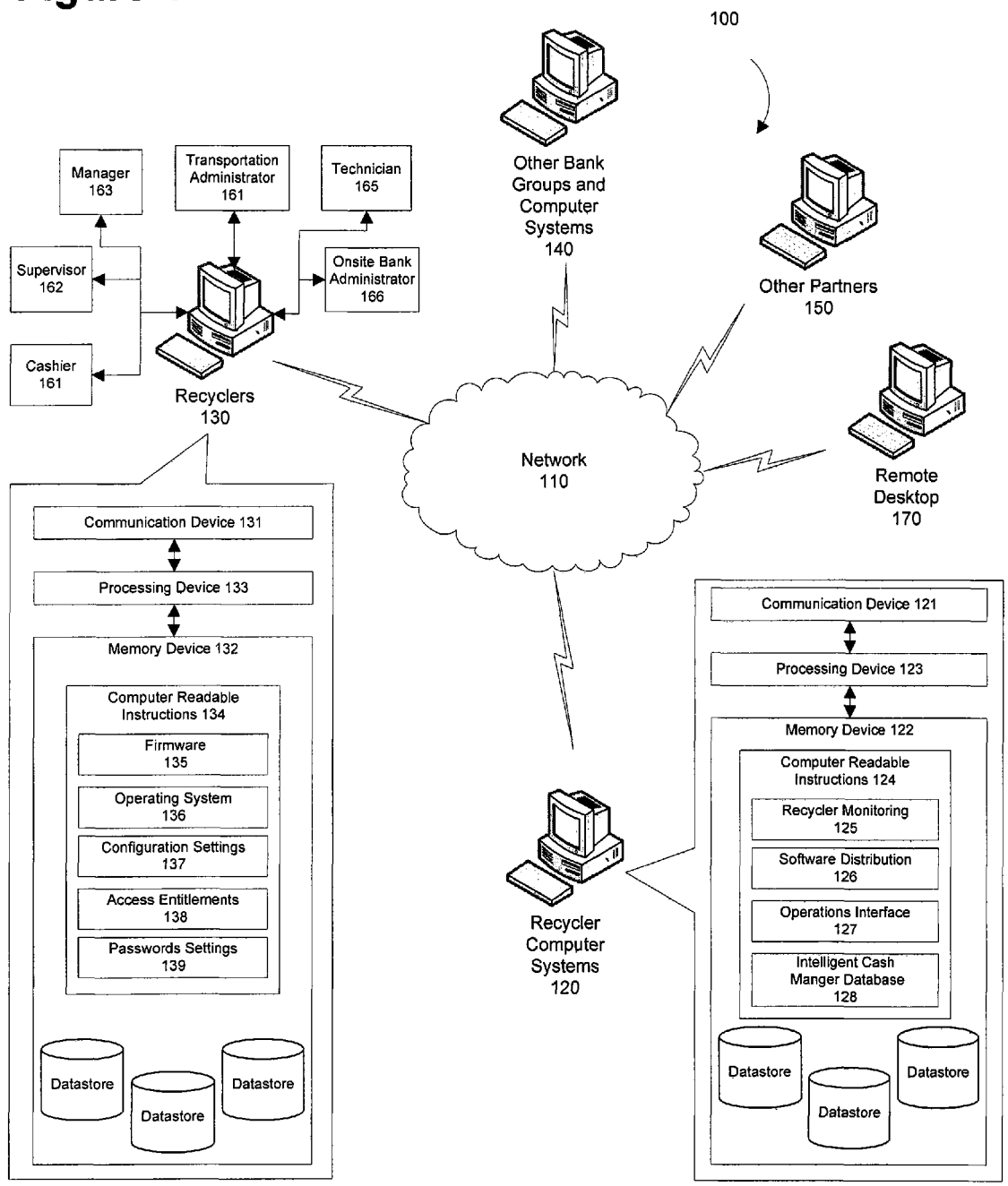
Figure 2:
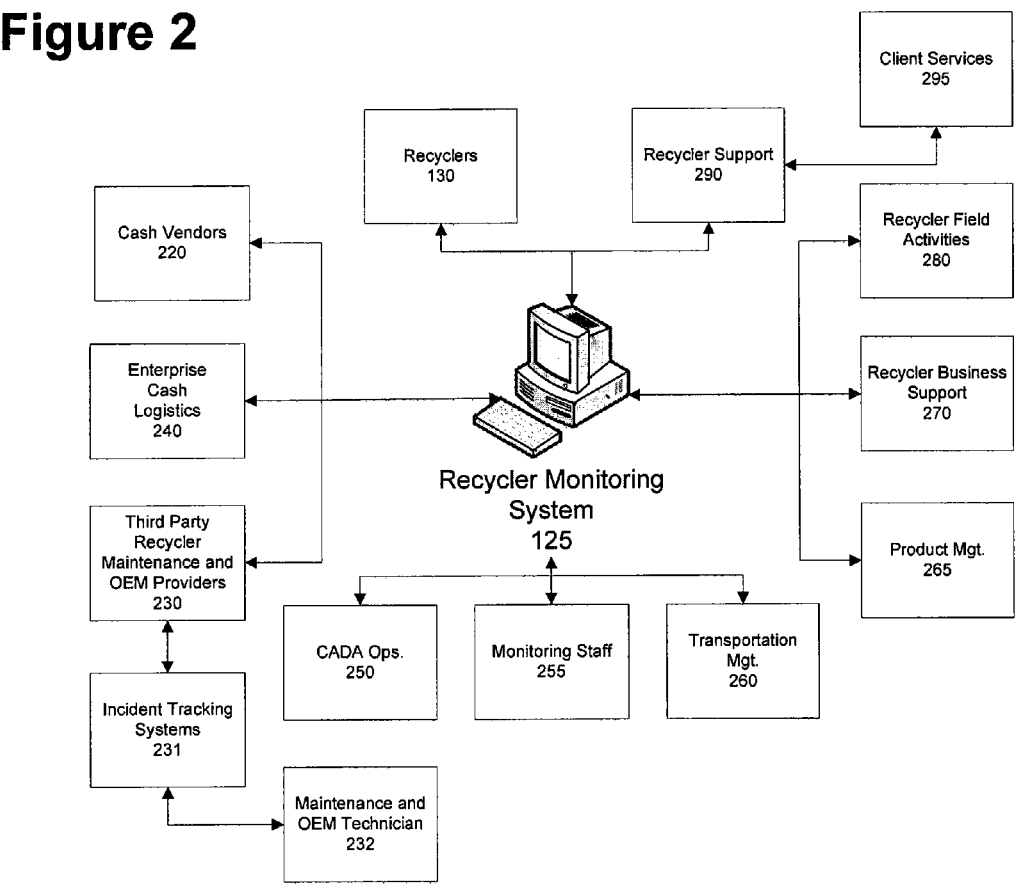
Figure 3:
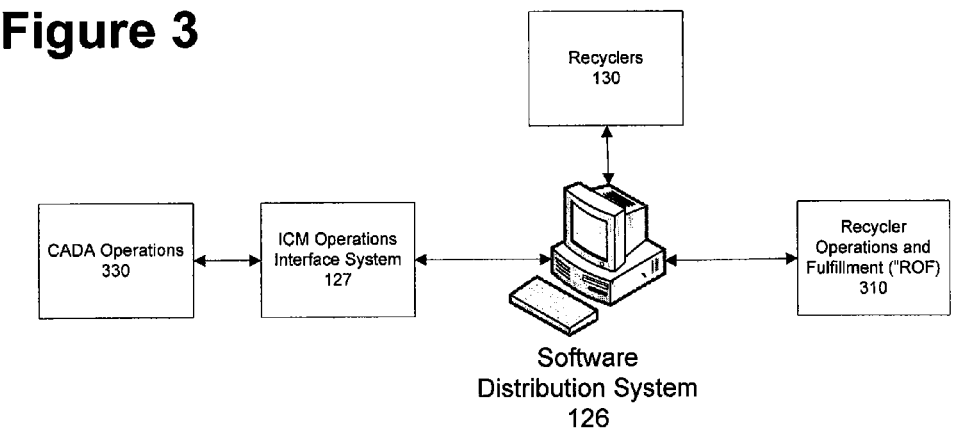
Figure 4:
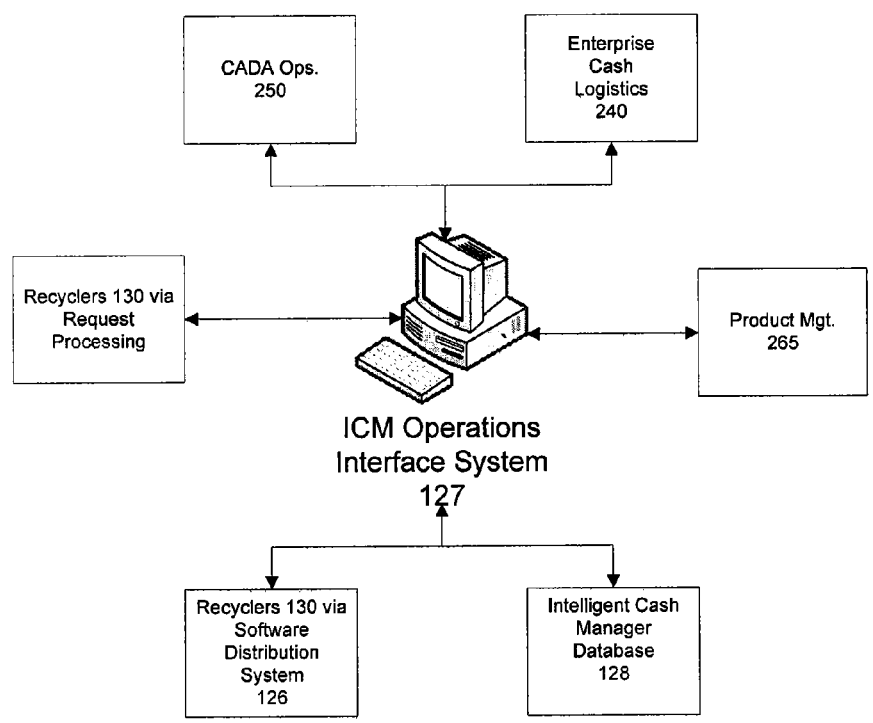

Having thus described embodiments of the invention in general terms, reference will now be made to the accompanying drawings, which are not necessarily drawn to scale, and wherein:

FIG. 1 illustrates an Intelligent Cash Manager system, in accordance with an embodiment of the present invention;

FIG. 2 illustrates a recycler monitoring system, in accordance with an embodiment of the present invention;

FIG. 3 illustrates a software management system in accordance with an embodiment of the present invention; and FIG. 4 illustrates an operations interface system, in accordance with an embodiment of the present invention.

DETAILED DESCRIPTION OF EMBODIMENTS OF THE INVENTION

Embodiments of the present invention now will be described more fully, hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

In the context of this document, a computer-usable or computer-readable medium may be any medium that can contain, store, communicate, propagate, or transport the program for use by or in connection with the instruction execution system, platform, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF), or other means.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart, and/or block diagram block or blocks.

The computer program instructions may also be loaded onto a computer or other programmable data processing apparatus to cause a series of operational steps to be performed on the computer or other programmable apparatus to produce a computer implemented process, such that, the instructions which execute on the computer or other programmable apparatus, provide steps for implementing the functions/acts specified in the flowchart, and/or block diagram block or blocks. Alternatively, computer program implemented steps or acts may be combined with operator or human implemented steps or acts in order to carry out an embodiment of the invention.

FIG. 1 illustrates one embodiment of an Intelligent Cash Management ("ICM") System 100, which consists of a cash recycler environment, as it would operate in a financial institution such as a bank, as described herein. However, it is understood that the apparatus and method for using the apparatus, may be used in other types of financial institutions or other businesses in general. The ICM consists of recycler(s) 130, which reside in the back offices or cash rooms of a client environment and are able to accept and dispense cash. The recyclers 130, as discussed further below, are electronically coupled to the recycler computer systems 120, operated by a bank. Remotely tying all of the recyclers 130 used by the bank's customers together allows the bank to provide customers cash handling efficiencies that reduce cost and time, support data analysis, and offer transparent insight into the cash position of a store (or multiple stores) to assist in managing liquidity. In addition, when necessary, the bank may also provide the customer with rapid recognition of the funds that reside in each recycler device, update the recycler systems, and troubleshoot any potential issues. This will allow the Bank to avoid additional full-time equivalent ("FTE") and maintenance costs, as the volume of recyclers grows to a point where effectively servicing them with technicians every time there is an issue with a recycler is not cost efficient. The ICM system 100 is network carrier and medium neutral, so that switching between carriers can be done easily with minimal impact to people, processes, and technology.

The cash recyclers 130 generally comprise a communication device 131, a memory device 132, and a processing device 133 operatively coupled to the communication device 131 and the memory device 132. The processing device 133 uses the communication device 131 to communicate with the network 110 and ultimately with the recycler computer systems 120, as well as other bank groups and computer systems 140, other bank partners 150, as well as remote desktops 170. As such, the communication device 131 generally comprises a modem, server, or other device(s) for communicating with other devices through the network 110. As further illustrated in FIG. 1, the cash recyclers 130 include computer-readable program instructions 134 stored in the memory device 132, which include the computer-readable program instructions 134 of a number of hardware or software components including but not limited to, firmware 135, the operating system 136, configuration settings 137, access entitlements 138, and password settings 139.

A number of people at the remote location may have various levels of access to the cash recyclers 130, including but not limited to cashiers 161, supervisors 162, managers 163, transportation administrators 164, maintenance technicians 165, and on-site bank administrators 166. Each individual customer may determine the appropriate levels of access for different employees and partners. For example, in one embodiment, cashiers 161, supervisors 162, managers 163, and on-site bank administrators 166 may all have access to the cash recyclers 130 for withdrawing, depositing, and exchanging cash, but the cashiers of some customers may not have access to close out the registers. Furthermore, only supervisors 162, managers 163, and on-site bank administrators 166 may have the ability to create, delete, or edit users of the cash recycler 130. Also, the supervisors 162, managers 163, and on-site bank administrators 166 may all have the ability to access the register reports and the transaction reports, but the supervisors 162 may be prohibited from accessing the balance report. Furthermore, the manager 163 and on-site bank administrator 166 may be the only ones with the access to change the minimum and maximum stock levels, the withdrawal limits, the passcode, or the hours of the cash recycler 130 operation. The transportation administrator 164 may be the only one with access to all of the cash in the safe. Each customer might have their own rules for granting access to the different features of each recycler at each site. Each cash recycler 130, as well the ICM database that is discussed later, will track and record each individual or user that accesses the cash recycler 130 and their transactions made over the period of time they are logged into the computer.

As illustrated in FIG. 1, the bank's recycler computer system 120 generally comprises a communication device 121, a memory device 122, and a processing device 123 operatively coupled to the communication device 121 and the memory device 122. The processing device 123 uses the communication device 121 to communicate with the network 110. As such, the communication device 121 generally comprises a modem, server, or other device for communicating with other devices on the network 110. As further illustrated in FIG. 1, the bank's recycler computer system 120 includes computer-readable instructions 124 stored in the memory device 122, which includes the computer-readable instructions 124 of the recycler monitoring system 125, the software distribution system 126, the ICM operations interface system 127, and the intelligent cash manager database 128.

The recycler computer system 120 gives the bank or other third party the remote capability, including but not limited to, assisting the client in training, re-establishing passwords, adding or deleting users, changing settings, installing remote patches, installing upgrades, rebooting the machine, and more generally remotely accessing all the features a technician would have if the technician was located onsite. The recycler computer system 120 communicates with other bank groups and computer systems 140, other partners 150 outside of the bank, who may be utilized for controlling a number of applications for the cash recyclers 130, as well as remote desktop 170 users, in order to run applications that work in conjunction with the cash recyclers 130.

As illustrated in FIGS. 1 and 2, the recycler monitoring system 125 is a system stored within the memory device 122 and run by the computer-readable instructions 124 of the bank recycler computer systems 120. The recycler monitoring system 125 monitors the remote cash recyclers 130 for issues related to the hardware and software of the machines, and the metrics associated with ICM system 100. The recycler monitoring system 125 automatically creates tickets for the incidents, routes the tickets to the appropriate recycler maintenance partner, bank group, or associate, and tracks the ticket through to resolution. The recycler monitoring system 125 will interface with a number of other systems and groups, both inside and outside of the bank, to support the creation and resolution of the tickets.

The recycler monitoring system 125 is continuously monitoring, tracking, and sending diagnostic tests to the cash recyclers 130. In response, the cash recyclers 130 are continuously communicating with the recycler monitoring system 125 by returning diagnostic information, alerts, and system status reports. Upon receiving recycler diagnostic information, alerts, and system status reports, the recycler monitoring system 125 will follow bank business rules and deliver the diagnostic information, alerts, and system status reports to the group or individuals who requested it, or who are responsible for tracking and monitoring that particular information.

One of the other partners 150 tied into the recycler monitoring system 125 is the maintenance and original equipment manager ("OEM") providers 230, who are usually outside third party partners who have service agreements with the bank or supply parts for the cash recyclers 130. An automated system-to-system interface exists between the recycler monitoring system 125 and the maintenance and OEM providers 230. Once the recycler monitoring system 125 receives an alert related to the service of the cash recyclers 130, it will dispatch a "maintenance needed" incident request ticket to the appropriate maintenance or OEM service provider 230. Alerts are sent directly to the specific maintenance and OEM provider's own internal incident tracking systems ("ITS") 231. The maintenance and OEM technicians 232 have the ability to update, open, or close the "maintenance needed" tickets dispatched to them on their ITS. Any maintenance and updates by the OEM technician 232 to the ITS will automatically update the bank's recycler monitoring system 125. The updates made by each maintenance or OEM service provider 230 are tracked in real time and update the other bank applications. The maintenance and OEM service providers 230 may remotely connect to the cash recyclers 130 to test the hardware and software or they may visit the location of the recycler to resolve the "maintenance needed" tickets.

The recycler monitoring system 125 also interacts with the enterprise cash logistics ("ECL") group 240, which is a part of the other bank groups or computer systems 140. The ECL group 240 receives ticket requests, including but not limited to, a hard rebalance, a special empty, or recycler full, from the cash recyclers 130. For example, when the ECL group 240 receives a "recycler full" alert, that means the cash recyclers 130 are full and cash should be removed. Recycler denomination balances are sent to the ECL group 240 when an alert from the recycler monitoring system 125 indicates that cash is reaching high levels and the recycler 130 may need to be emptied. The ECL group 240 will also receive alerts when the cash levels, including the levels of any particular denomination, are getting too low. The recycler denomination balance information contains, but is not limited to, a list of the denomination of notes and the associated starting balance, cash in, cash out, net usage, ship in, ship out, ending balance, the number of notes and the maximum notes that can be held for each recycler. The recycler denomination balances are used to determine if the recycler really needs to be emptied. The automatic updates of the cash recycler 130 balance information allows a bank and customer to track the cash levels in the cash recycler 130 in order to prevent the levels from becoming too high or too low.

After receiving a recycler full ticket and determining that the cash recycler 130 does in fact need to be emptied, the ECL group 240 will request service through the recycler monitoring system 125 from the appropriate cash vendors 220 to empty the cash recycler 130, or to have the customer at the site remove cash from the machine and deposit it directly with the bank. The ECL group 240 then automatically updates the open ticket received to indicate that the ticket is in process. The cash vendors 220 will work with the transportation management group 260 to schedule a time to visit the cash recycler 130 location, retrieve the cash from the cash recycler 130, and deliver the cash to the bank for deposit. Later, after the cash is removed from the recycler and deposited in the bank, the ECL group 240 will close out the recycler full ticket. The ECL group 240 is thus able to view tickets assigned to them, as well as make immediate on-line updates to tickets, close tickets, and if necessary open new tickets related to the flow of cash. The ECL group 240 may access the intelligent manager database 128, discussed later, to look up cash usage, profile information, and transaction history involved with specific cash recyclers 130.

The other bank groups and computer systems 140 also include recycler support 290 and client services 295 teams, which use the recycler monitoring system 125 to view incidents related to the cash recyclers 130 and the status of the incidents, as well as to add new incidents reported by the client. Recycler support 290 receives cash recycler 130 status reports and alerts related to the operation of the cash recycler 130 in conjunction with the service level agreements ("SLA") agreed to between the customers and the bank. If a cash recycler 130 metric is outside the threshold defined by the SLA, then the recycler support 290 team will receive an alert that there is an issue with the cash recycler 130. Recycler support 290 should then be proactive in assessing and removing issues that are outside of the threshold limits identified in the SLA.

Client services 295 assigns a client services advisor ("CSA") for each cash recycler 130 and the recycler monitoring system 125 will send alerts to the CSA when an incident ticket is open that falls outside of the established SLA requirements. In order to assist the client, client services 295 also receives tasks directly from the customer. Client services 295 may use the software distribution system 126, discussed later, to perform tasks, such as but not limited to, re-setting the customer passwords, making application access updates for client administrators, and adding/deleting client administrators in real-time. Client services 295 can use the recycler monitoring system 125 to view the status of the recycler's health upon client inquiry. They may add tickets directly to the recycler monitoring system 125 when they discover an issue, if an alert has not already been automatically created.

Another bank group 140 that the recycler monitoring system 125 communicates with through the network 110 is the recycler monitoring staff 255. The recycler monitoring staff 255 monitors the recycler monitoring system 125 and the recycler 130 performance. The recycler monitoring system 125 follows bank provided business rules and passes on to the recycler monitoring staff 255 the monitoring information and the exceptions in the system that require escalation (e.g., recycler down-time outside of parameters). The monitoring information and exceptions include, but are not limited to, incidents, the status of the incidents, and alerts for exceptions or tickets, which may be outside of SLA thresholds and require escalation to the appropriate group within the bank. The recycler monitoring staff 255 has the ability to make immediate on-line updates to tickets, close tickets, and open new tickets through the recycler monitoring system 125. The recycler monitoring staff 255 will track all the tickets in the system, making sure the tickets are sent to the proper groups and that those groups are taking care of the issues related to their tickets.

The recycler monitoring system 125 is connected to another bank group 140, the recycler business support 270 team, which is able to view incidents and the status of incidents of the business aspects related to the recyclers 130. The recycler business support 270 team also has the ability to make immediate on-line updates to tickets, close tickets, and open new tickets related to the business support of the recyclers. The business support team 270, as well as other groups will be able to track the level of performance of a given recycler 130 and schedule more frequent service for that recycler 130 if necessary.

The transportation management group 260 is another bank group 140 that communicates with the recycler monitoring system 125. The transportation management group 260 is able to view the armored carrier performance metrics through the use of the recycler monitoring system 125. The transportation management group 260 monitors metrics, such as the timing of how long the carrier performed specific functions, the transportation schedules, and reconciliation and payment of carrier invoices. The group may report the details of the metrics to the other bank 140 who might be interested in the metrics. For example, the transportation management group 260 will send the transportation schedule to the cash vendor 220, so they know when, where, and how much they need to pick up from or deposit into a cash recycler 130.

The product management team 265 is yet another bank group 140 that communicates with the recycler monitoring system 125. The product management team 265 is able to view monthly reports of product performance metrics for the cash recyclers 130. The information in the reports is summarized by both location and account number. The information includes, but is not limited to the account number, location, number of recyclers, number of tickets, number of service calls, the reason for the service calls, the outcome of the service calls, number of incidents, up-time, transaction counts, and transaction amounts. The product management team 265 also receives product statistic reports. The product statistic reports are used to obtain more detail on client behavior by assisting in understanding usage volumes and helping to prepare management reporting documents by viewing the cash recycler statistics. The product statistics information contains, but is not limited to the client name, the industry group number, the industry name, the number of recyclers, changed bills, changed bills total amount, withdrawals, withdrawal total amount, deposits, deposit total amounts, ship in, ship in total amount, ship out, ship out total amount, and total number of all transactions. The product statistics information also includes a summary of the transaction counts and amounts for all of the cash recyclers 130 in the field, or for the cash recyclers 130 grouped by client or industry.

The Cash Automation with Data Analysis ("CADA") Operations 250 is another bank group 140 that communicates with the recycler monitoring system 125. Upon receiving recycler alerts, the recycler monitoring system 125 follows bank business rules and dispatches to CADA Operations 250 the "physical vs. logical count problem" incidents, which are the physical count of the denomination of notes in the recycler vs. what logically should be in the recycler. Some recyclers are prone to having the physical count differ from the logical count over time due to counting errors in the recycler machinery. Therefore, each machine may need to be periodically physically emptied and re-filled to correct for any difference in the physical vs. logical count. Data related to the counts is sent to CADA so they can track and have the potential problems in the recycler software or hardware fixed. CADA Operations 250 will have access to trace files, request processor ("RP") information, and database information on demand without needing bank technology support services assistance in a user-friendly format. Trace file information contains all recycler transactions that have been sent to the demand deposit account ("DDA") systems for posting at the end of day. The trace file information includes, but is not limited to status, date, time, recycler transaction type, total amount, note counts (denomination and number of bills or coins entered), a summary description, comments, and the user making the transaction. Request processor information is transaction information from the recycler itself that includes intra-day transactions and transactions when the recycler returns back on-line from being in Store/Forward mode. Request processor information includes, but is not limited to location numbers, recycler identification, recycler model number, date, time, recycler transaction type, posting amount, total amount, ending balance summary description, comments, user, transaction detail amount (total amount of each note count), and note counts. The database information is needed to consolidate or close a general ledger account used to hold CADA cash, or is used to determine which recyclers are processed at a vault. The database information is either displayed as recycler profiles or client profiles. The recycler profile will display a list of recyclers that are processed by the vault. The information displayed is the cash vault name, vault type, teller identification, cost center, and recycler profile information. The client profile will display a list of client locations for the vault or a single recycler selected. The information displayed is the cash vault name, cash vault type, and client profile information. CADA Operations 250 also has the ability to enter one-time billing payments into the system, enter recycler setting changes and status changes remotely and push the updates to the cash recyclers 130.

Another bank group 140 that communicates with the recycler monitoring system 125 is the Recycler Field Activities 280 group. The Recycler Field Activities 280 group monitors the cash recycler 130 performance data and uses the data to predict the upcoming machine cleaning or upgrading needs. The group will also schedule machines to be replaced if they do not meet performance specifications.

For the internal bank groups and computer systems 140, and other partners 150, the administrators of those groups can remotely execute command actions on the cash recyclers 130, in order to further diagnose an incident or take steps to begin to fix the incident. System administrators can view diagnostic information, such as, but not limited to log files or memory dumps, using the recycler monitoring system 125. They can also access the cash recyclers 130 via the recycler monitoring system 125 to perform actions, such as, but not limited to performing specific recycler commands, initiating re-starts, or modifying trace files levels. When the administrators are pushing updates to the cash recyclers 130, they have an option to apply any changes to the local recycler or to multiple recyclers associated with the location or account. Any time an administrator or other user remotely accesses the ICM system 100, including the remote cash recyclers 130, the access occurs via a secure method. The recycler monitoring system 125 allows a person with access to review an individual administrator's or user's access and login history to any part of the ICM system 100.

As illustrated in FIGS. 1 and 3, a software distribution system 126 is tied to the cash recyclers 130 and a number of the other bank groups and computer systems 140, through the network 110. The software distribution system 126 will maintain and update an inventory including, by not limited to the firmware 135, operating system software 136, configuration settings 137, modem entitlements, access entitlements 138, and password settings 139 on the installed base of production cash recyclers 130 and provide flexible reporting of this information back to the recycler monitoring system 125.

Recycler operations and fulfillment ("ROF") 310 is one of the other bank groups 140 that communicates with the cash recyclers 130 using the software distribution system 126 and the network 110. ROF 310 uses the software distribution system 126 to perform installations and distribute changes in firmware 135, operating system software 136, and machine configuration settings 137 to name a few remotely to the cash recyclers 130. ROF 310 is able to examine the cash recycler 130 diagnostics in real-time. They are able to view and report monitoring information and reporting metrics in a customizable fashion with ad hoc reporting, including an inventory of hardware, software, firmware or access entitlements for the installed recycler base. Along with ROF 310 identifying potential issues, the software monitoring system 126 proactively identifies possible problems with the cash recyclers 130, alerts ROF 310, and provides a comprehensive suite of diagnostic tools. The ROF 310 team receives the proactive alerts and uses the diagnostic information related to the alerts to help diagnose and fix the incidents with the associated cash recyclers 130. The ROF 310 team has the ability to push the fix of software changes or other setting changes remotely to individual cash recyclers 130 using the software distribution system 126.

The CADA Operations 250 team communicates with the software distribution system 126 through the ICM operations interface system 320, discussed later, and the network 110. The CADA Operations 250 team can make recycler configuration setting changes and change the active status of recyclers via the ICM operations interface system 127. Those changes are then sent to the software distribution system 126, which remotely updates the appropriate cash recycler 130 on a daily basis. The recycler settings that CADA Operations 250 can change include, but are not limited to, the maximum and target for each denomination, store and forward dollar limits, daily withdrawal limits, limits by job title, passwords, user edits, hours of operation, and recycler identification numbers.

When pushes of the software, firmware, and configuration setting changes to remote cash recyclers 130 occur, they should take place outside the time a user is conducting a transaction. This may be outside a client's hours of operation, however, if it occurs when a transaction is being made on-site at the cash recycler 130, the update will continue only when the transaction is completed and the user is logged off of the cash recycler 130. Additionally, when an update is in progress, the system is locked from use by anyone until the update is complete. Each cash recycler 130, as well as the ICM database 128, discussed later, will keep a software release history for all the software that has been added or updated on each device.

As illustrated in FIGS. 1 and 4, there is an ICM operations interface system 127 that CADA Operations 250 and other groups use to retrieve and report recycler transaction information. As previously indicated, the ICM operations interface system 127 provides the bank with the ability to push configuration settings and status information to the cash recyclers 130. In addition, this system will make recycler settings and profiles visible to the other groups and allow for remote updates to recycler configuration settings by those groups. The ICM operation interface system 127 provides the bank the ability to enable timely resolution of reconcilement issues. Recycler trace file information, recycler request processor ("RP") transaction information, database recycler profile information, CADA database information, and recycler statistics for metrics reporting are all sent to CADA Operations 250 through the ICM operation interface system 127. CADA Operations 250 uses the ICM operation interface system 127 to update recycler settings and recycler active/inactive status, as well as to enter one-time billing payments. The ECL group 240 uses the ICM operation interface system 127 to look up real-time denomination balances of the cash recyclers 130, and product management will use the ICM operation interface system 127 for summary statistics on the product.

The intelligent cash manager ("ICM") database 128 is used by the cash recyclers 130, recycler computer systems 120, other bank groups and computer systems 140, and other partners 150 to store and retrieve back-up data stored on other systems within the ICM system 100. The ICM database 128 stores all the recycler profiles and updates the profiles when they are changed on each cash recycler 130. The ICM database 128 also stores all of the clients' configuration settings, including, but not limited to user IDs, user limits, passwords, alarm codes, robbery settings, drum configurations, etc., which can be pushed to each cash recycler 130 when needed. The configuration settings file will re-establish the clients' settings after a re-image of their cash recycler, or some other issue that causes the recycler to lose the client settings. The file stored on the ICM database 128 is editable so that it can be created in advance and subsequently pushed to the cash recycler 130. The transportation schedules are also stored on the ICM database 128 in an easy to look up fashion as part of the recycler profiles. Furthermore, the ICM database 128 stores the cash usage history for each cash recycler 130 in case there is a problem with a particular cash recycler 130, and the information on that cash recycler 130 is lost.

Other bank computer systems 140, such as financial computer systems may be tied into the ICM system 100 in one embodiment of the invention. The financial systems communicate with the recycler monitoring system 125, the software distribution system 126, the ICM operations interface system 127, and the ICM database 128, in order to track and update any financial accounting and reconciliation between the banks and the clients using the cash recyclers 130. Clients may log into online accounts and view real-time balance information for one or more of their machines.

Embodiments of the present invention further provide a plurality of remote capability user interfaces to be displayed using a display device communicatively coupled to a computing device. These user interfaces are generated and operated by a processor executing computer-readable program instructions embodied in a computer-readable medium. There are a number of critical-to-quality metrics ("CTQ") measured and tracked in the user interfaces, such as, but not limited to the client cash handling time, the time to recognize funds, the time spent to determine cash position, and recycler uptime. Client cash handling time CTQs are a measure of all types of cash activities at the client's location, such as Point-of-Sale reconciliation time, deposit preparation time, as well as other cash processes at opening, shift change, and closing. The time to recognize funds CTQ is the time from deposit or withdrawal of funds until the time that the bank recognizes the funds in each account. The time spent to determine cash position CTQ is the time from recycler activity to the time the information is ready for reporting. The recycler uptime CTQ is the time the recycler is in operation during business or maintenance hours, conversely the downtime is when the recycler is off-line due to software or mechanical failure, or a system upload is taking place.

As illustrated in FIG. 1, the ICM system 100 in some embodiments may also include a remote desktop 170 access feature. The remote desktop 170 allows a user not physically located at the recycler computer system 120, or other bank groups and computer systems 140 to securely log onto the ICM system 100. The user can then take over the client's machine or cash recycler 130 and assist the client in performing any task for the cash recycler 130 as if they were on the main ICM system 100, such as, but not limited to updating the software and changing the system configuration settings.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. An intelligent cash management system, wherein the system allows a user to remotely access a cash recycler operated by a customer of a financial institution at a location remote from the financial institution, the system comprising:
   a computer-readable medium providing computer-readable instructions;
   a recycler monitoring system operated by the financial institution, the recycler monitoring system being located offsite from the cash recycler and configured to continuously monitor the cash recycler for issues related to the hardware and software of the cash recycler;
   a processor operatively coupled to the recycler monitoring system and the computer-readable medium, wherein the processor is configured to execute the computer-readable instructions to use the recycler monitoring system to:
      identify recycler incidents; and
      resolve recycler incidents by automatically creating tickets for the incidents, routing the tickets to the appropriate recycler maintenance personnel, and tracking the tickets through to resolution;
   a software distribution system, the software distribution system being located offsite from the cash recycler;
   wherein the processor is operatively coupled to the software distribution system, wherein the processor is configured to execute the computer-readable instructions to use the software distribution system to:
      update at least one of an operating system, a firmware, a software application, or a setting on at least one remotely located cash recycler.

2. The intelligent cash management system of claim 1, wherein the recycler incidents comprise at least one metric that is outside of defined threshold limits.

3. The intelligent cash management system of claim 1, wherein the system further comprises:
   an operations interface system;
   wherein the processor is operatively coupled to the operations interface system, wherein the processor is configured to execute the computer-readable instructions to use the operations interface system to:
      change at least one of a configuration setting, an access entitlement, or a password on at least one remotely located cash recycler.

4. The intelligent cash management system of claim 1, wherein the system further comprises:
   an intelligent cash manager database;
   wherein the processor is operatively coupled to the intelligent cash manager database, wherein the processor is configured to execute the computer-readable instructions to use the intelligent cash manager database to:
      store for retrieval a file or back-up file comprising at least one of a cash usage, a transaction history, a profile data, a software maintenance history, a configuration setting, or a transportation schedule file.

5. The intelligent cash management system of claim 1, wherein the system further comprises:
   a display device;
   wherein the processor is operatively coupled to the display device, wherein the processor is configured to execute the computer-readable instructions to use the display device to:
      display information about the recycler incidents tracked in the recycler monitoring system; wherein the information is displayed in a dashboard.

6. A method for remotely accessing, monitoring, and servicing cash recyclers, wherein an intelligent cash management system allows a user to access at least one remotely located cash recycler operated by a customer of a financial institution, the method comprising:
   using a computer system for communicating with the remotely located cash recycler, the computer system being operated by the financial institution;
   continuously monitoring a metric for the remotely located cash recycler;
   receiving notification of an incident when the metric is outside of a determined threshold limit;

accessing the remotely located cash recycler via the computer system, the computer system being located offsite from the cash recycler;

remotely seizing control of the cash recycler; and resolving the incident.

7. The method of claim 6, wherein monitoring the metric for the remotely located cash recycler further comprises:

using a display device to monitor the metric related to the remotely located cash recycler on a dashboard.

8. The method of claim 6, wherein resolving the incident further comprises:

performing diagnostic checks of the remotely located cash recycler.

9. The method of claim 6, wherein resolving the incident further comprises:

sending the incident electronically to a group responsible for resolving the incident.

10. The method of claim 9, wherein resolving the incident further comprises:

monitoring the status of the incident until the incident is resolved.

11. The method of claim 6, wherein resolving the incident further comprises:

updating the remotely located cash recycler by performing at least one of making changes to a recycler configuration setting, pushing a new file to the remotely located cash recycler, or updating software or firmware associated with the remotely located cash recycler.

* * * * *